United States Patent [19]

Meyer

[11] 4,341,278

[45] Jul. 27, 1982

[54] WHEELCHAIR

[76] Inventor: Wilhelm Meyer, 7 Kirchstrasse, 4973 Vlotho, Fed. Rep. of Germany

[21] Appl. No.: 120,822

[22] Filed: Feb. 12, 1980

[30] Foreign Application Priority Data

Feb. 19, 1979 [DE] Fed. Rep. of Germany ....... 2906372

[51] Int. Cl.³ .............................................. B62D 5/04
[52] U.S. Cl. .............................. 180/79.1; 180/DIG. 3
[58] Field of Search ....................... 180/333, 79.1, 142, 180/DIG. 3

[56] References Cited

U.S. PATENT DOCUMENTS

| 2,586,273 | 2/1952 | Steven | 180/333 |
| 3,022,850 | 2/1962 | Bidwell et al. | 180/333 |
| 3,566,986 | 3/1971 | Udden | 180/79.1 |

FOREIGN PATENT DOCUMENTS 2823354 12/1979 Fed. Rep. of Germany ..... 180/79.1

Primary Examiner—John A. Pekar
Attorney, Agent, or Firm—Dennison, Meserole, Pollack & Scheiner

[57] ABSTRACT

An electrically driven wheelchair having steerable rear wheels controllable by means of a joystick control operating an electromechanical steering mechanism including a control circuit.

The electrical control circuit includes a voltage divider which receives a voltage determined according to the travelling speed of the wheelchair to enable the turning circle of the steering mechanism to be adjusted in relation to the travelling speed, so that at high speeds a large turning circle only is available while at low speeds a small turning circle is allowed, thereby minimizing the possibility of tipping the wheelchair over by turning too sharply at high speed.

1 Claim, 4 Drawing Figures

WHEELCHAIR

BACKGROUND OF THE INVENTION

The present invention relates to a wheelchair having an electric drive, and steerable wheels which may be steered by means of a joystick via an electro-mechanical control device. The steerable wheels may be pivotally moved into a lateral angular position to enable the wheelchair to be driven in a straight line or along a curved path.

In known wheelchairs the steerable wheels may be swivelled relatively hard to one side or the other in order to provide a small turning circle (bend radius). However, a large lateral lock of the steerable wheels could lead to an accident if it were applied fully when the wheelchair was travelling at too high a speed, since the inertia (rotary mass) of the wheelchair containing the passenger and the centrifugal force acting on the wheelchair, may be too large to follow the curved path of the steered wheels, and in such a case the wheelchair tips over. For this reason stops have been provided on the chassis to limit the lateral deflection (lateral lock) of the steerable wheels. This has the disadvantage of producing an undesirably large turning circle. Also, with a steering speed which is proportional with the travelling speed of the vehicle, the tilting moment with full steering lock still occurs but is only delayed in time.

It is an object of the invention to develop a wheelchair having a steering device such that the maximum possible lateral lock of the steering wheels is so controlled and limited in dependence upon the travelling speed and that the moment of inertia (rotary mass) of the turning movement of the wheelchair (the lateral deflection of the steering wheels) is proportional, so that the wheelchair follows the turning movement of the steering wheels at any speed and hence the centrifugal force does not cause the wheelchair to tip over.

SUMMARY OF THE INVENTION

In accordance with the invention there is provided a wheelchair having an electric drive and steerable wheels which are pivotally mounted and displaceable into a desired lateral angular position by means of a control stick via an electromechanical control apparatus including a control circuit, wherein a voltage divider is connected into the circuit of a control apparatus and provided with a voltage the magnitude of which is determined by the travelling speed of the wheelchair, which voltage divider at high travelling speed supplies a low voltage and at a low travelling speed supplies a high voltage to an electric nominal value transmitter for the pivotal movement of the steerable wheels the maximum steering lock of the steerable wheels being controllable in dependence upon the travelling speed of the wheelchair.

Such a control device has the advantage that the maximum possible steering lock is obtained depending upon the travelling speed, so that the wheelchair does not tend to tip over at high travelling speeds, but rather steers around a large turning circle, whilst at a low travelling speed (e.g. in rooms) the wheelchair may be driven over a small turning circle.

In a preferred embodiment a voltage divider is connected into the circuit of a control circuit, which divider at high travelling speed connects a low voltage and at a low travelling speed a high voltage to an electric adjusting motor for the steering movement of the steerable wheels.

For this purpose it is preferred to provide a nominal value and an actual value potentiometer circuit for supplying the adjusting motor which is provided with a voltage compensating apparatus for the rest position of the steering wheels.

At low travelling speeds the maximum steering deflection may be used and hence a small turning circle obtained.

In a preferred embodiment the control device for the steering wheels is adapted as an electromechanical servo-drive. The lateral deflection value, predetermined by means of an electric nominal value generator, is compared with the electric actual value of the lateral deflection provided at the control drive. A follow-up control system actuates the electric adjusting motor for as long as the electric values of actual and nominal value sufficiently coincide.

BRIEF DESCRIPTION OF THE DRAWINGS

The invention will be described further, by way of example with reference to the accompanying drawings, in which.

DETAILED DESCRIPTION

Figure 1:
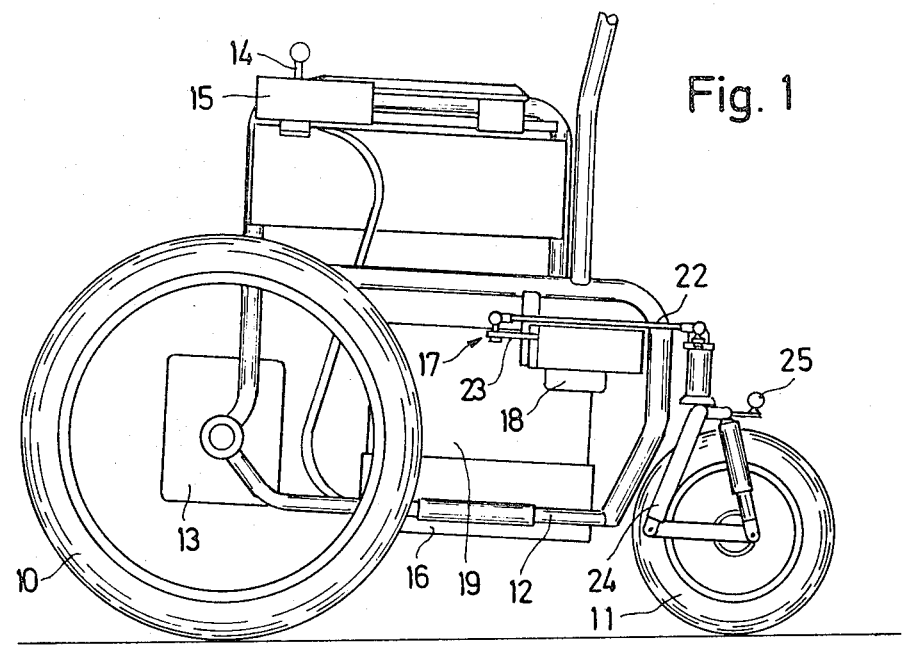
FIG. 1 is a schematic side elevation of a wheelchair with control casing, mechanical steering gear and electric switch box for controlling a pair of rear steerable wheels.

A wheelchair shown in FIG. 1 has a pair of large front wheels 10 and a pair of smaller rear steerable wheels 11 which are all mounted on a chassis 12. The front wheels are driven by means of an electric drive motor 13.

The steering angle of the pivotally mounted rear steerable wheels 11 is controllable via an electric control circuit provided in box 16 and a mechanical steering gear 17 by means of a control stick 14 arranged on a side frame of the chassis 12, which stick 14 is pivotally mounted in a control box 15. The control stick 14 also controls the travelling speed via the drive motor 13.

The control stick 14 is operated by the hand pressure of a person sitting in the wheelchair, on the one hand, in the longitudinal direction of the wheelchair for controlling the travelling speed and on the other hand, at right angles of the longitudinal direction of the wheelchair for steering the rear steerable wheels 11 by a required lateral angle (angles $\beta,\alpha$), for travelling around required bends.

Figure 4:
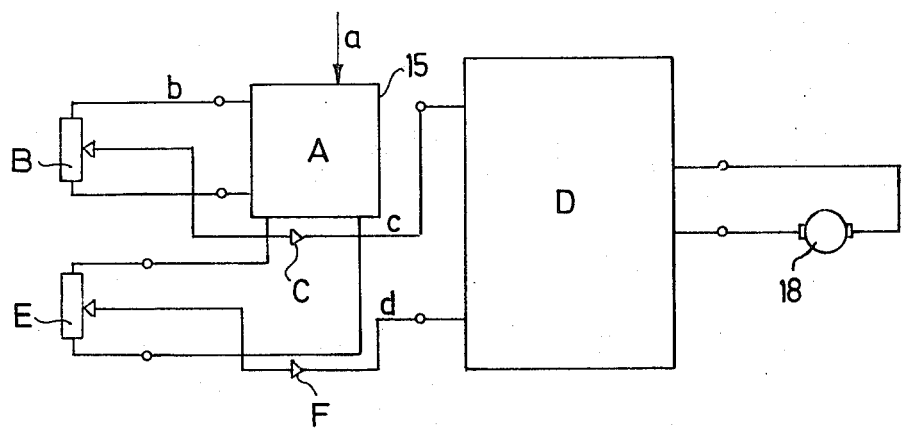
FIG. 4 is a block circuit diagram of the electric control system.

The control stick 14 operates as a nominal value transmitter on a transmitter potentiometer B (variable resistor FIG. 4), which, via a voltage divider A, receives a certain voltage via the lead b determined by the travelling speed. The voltage divider A via the lead a is supplied with a voltage varying in accordance with the deflection of the control stick 14. Thus, the voltage on lead a is provided in accordance with the position of control stick 14, backwards and forwards, as an indication of selected speed. The nominal output voltage (lead c) from the transmitter potentiometer B is conducted via an amplifier C to a differential amplifier (output amplifier) D.

The nominal voltage (lead c) from the transmitter potentiometer B is compared with the voltage of the actual value potentiometer E. The actual value potentiometer E is a variable resistor which indicates the actual value of the angular position of the steering wheels 11. Then the nominal and actual values are, respectively supplied via amplifier C and amplifier F. The differential amplifier D in produces an output signal for controlling the control motor 18 (steering motor), which operates to produce a left-hand turn or right-hand turn of the wheelchair and so adjusts the actual value transmitter until the nominal and actual value are identical.

In the adjustment unit for the rear steering wheels 11, the actual value potentiometer E is a variable resistor which indicates the actual value of the angular position of the steering wheels 11. The actual value potentiometer E is connected to a battery 19.

Figure 2:
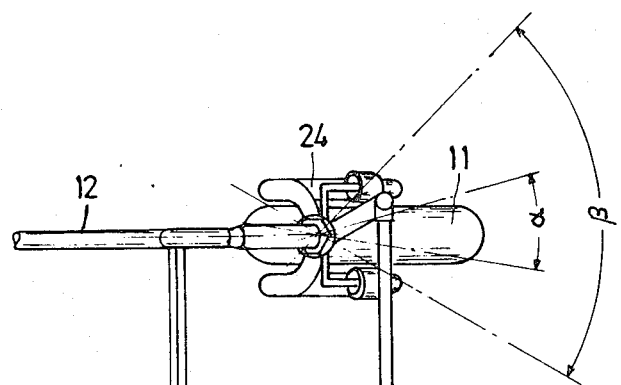
FIG. 2 is a partial plan view of the wheelchair of FIG. 1 with a rear pair of steering wheels.
Figure 2:
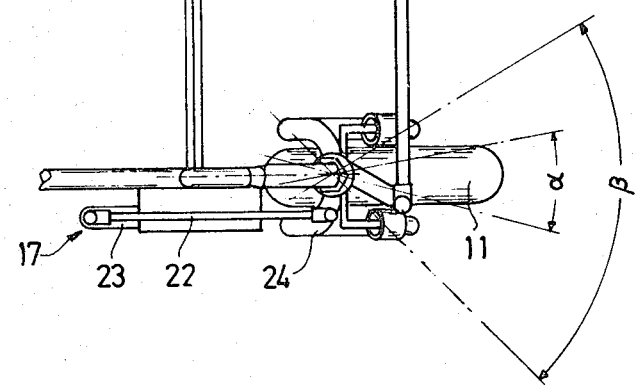
Figure 3:
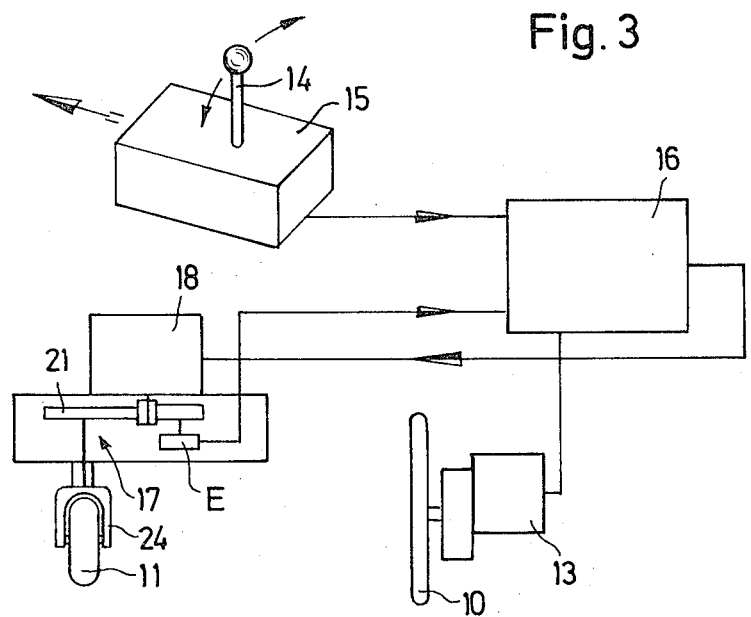
FIG. 3 is a schematic view of the mechanical and electric control system.

An important feature of the invention is that dependent upon the control voltage, which is derived from the travelling speed, the voltage supplied to the controllable voltage divider A is so divided that at high travelling speeds the voltage supplied to the nominal value potentiometer B is low and hence also the maximum possible steering lock (angle adjustment of the steering wheels 11 from the central position) is small (see angle α in FIG. 2). If the travelling speed is reduced, then the input voltage increases at the nominal value potentiometer and hence the maximum possible steering lock of the steering wheels 11 increases (see angle β in FIG. 2).

Thus, dependent upon the electrical magnitude determined by the travelling speed, the electric control value for the steering lock controlled by means of the control stick, reduces with increasing travelling speed.

Hence the control system evaluates the magnitude of the nominal value and the actual value of the steering lock of the steerable wheels 11 and actuates the control motor 18 as adjustment motor for the steering wheels until these values are equal.

For this purpose the nominal and actual values are constantly compared (in the differential amplifier D) and any control deviation formed. The control deviation is electronically amplified and controls the output part for the control motor 18. Depending upon as the whether the deviation is positive or negative, the control motor 18 is driven either forwards or in reverse.

In order with increasing travelling speed to attain a reduction of the lock angle (lateral angle) the nominal value predetermined by the control stick is reduced via the voltage divider A. The electric magnitude of the travelling speed recorded via the armature voltage or a tachometer device reduces the supply voltage of the nominal value potentiometer B.

The mechanical steering drive 17 includes the control motor 18 which displaces a racked bar 21, moves linearly to displace a steering rod 22 via angle joints 23 and hence turning the steering wheels 11 by means of a wheel fork 24. The steerable wheels 11 are interconnected by means of a track rod 25.

Because the steering geometry of the wheelchair, in a left-hand or right-hand bend, has the same radius of bend, the lateral lock of the steered wheel 11 which runs along the inside the bend is greater than the lateral lock of the steering wheel 11 running along the outside of the bend (outer radius of bend).

If the actual value potentiometer E is coupled to a steering wheel 11, varying electric values (asymmetry) result for an equal steering lock to the left-hand or right-hand of the wheelchair. For this purpose a separate electric compensation circuit (not shown) is provided which equalizes the difference during left-hand and right-hand lock.

A nominal value and actual value potentiometer with follow-up control may also be replaced by a suitable alternative control circuit for feeding the steering motor.

I claim:

1. A wheelchair having an electric drive and steerable wheels pivotally mounted and displaceable into a desired lateral angular position, an electromechanical control apparatus for turning said wheels, said control apparatus comprising:

a control circuit, and a control stick for actuating said control circuit, said control circuit including a voltage divider means which is provided with a voltage which is dependent upon the traveling speed of the wheelchair;

an electric control motor for controlling the pivotal movement of the steerable wheels;

first potentiometer means coupled to receive a voltage output from said voltage divider means, said first potentiometer means arranged for actuation by said control stick to provide a nominal value output signal;

second potentiometer means coupled to receive a voltage output from said voltage divider means, said second potentiometer means arranged for actuation in accordance with the actual value of the angular position of said steerable wheels, said second potentiometer means providing an actual value output signal; and, differential amplifier means having a first input coupled to receive said nominal value signal and a second input coupled to receive said actual value signal, and having an output, said differential amplifier means output coupled to said electric control motor for controlling the pivotal movement of said steering wheels, whereby pivotal movement and steering lock of said steerable wheels are controllable in dependence upon the traveling speed of the wheelchair.

* * * * *